(No Model.)
P. J. HOGAN.
Saw Swage.
No. 237,977. Patented Feb. 22, 1881.
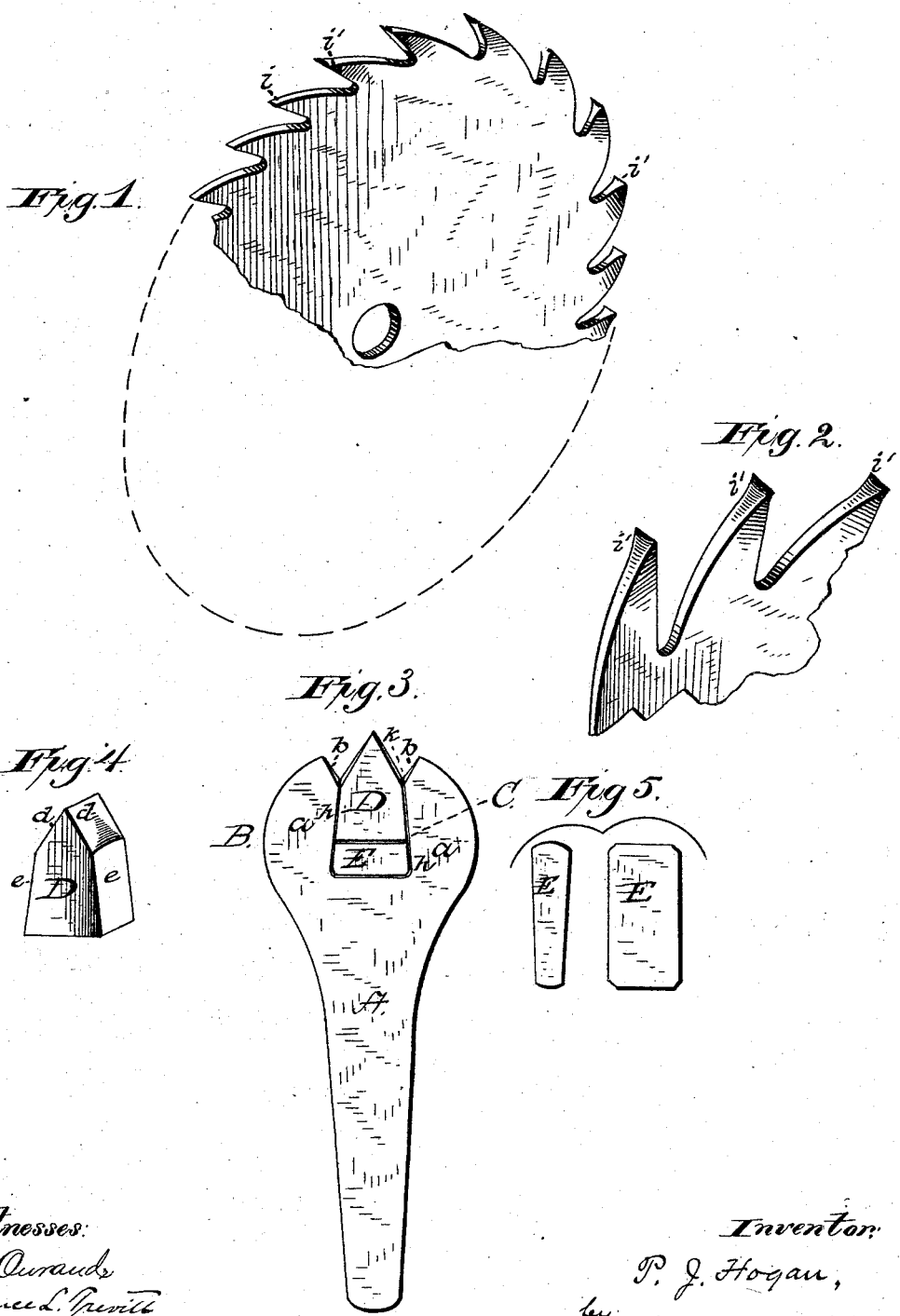

UNITED STATES PATENT OFFICE.

PATRICK J. HOGAN, OF CINCINNATI, OHIO.

SAW-SWAGE.

SPECIFICATION forming part of Letters Patent No. 237,977, dated February 22, 1881.

Application filed July 19, 1880. (No model.)

*To all whom it may concern:*

Be it known that I, PATRICK J. HOGAN, a citizen of the United States, residing at Cincinnati, in the county of Hamilton and State of Ohio, have invented certain new and useful Improvements in Saw-Swaging Tools; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of handtools known as "saw-tooth swages," having a die with inclined faces for swaging the teeth of saws.

The object of this invention is to spread, draw out, and sharpen the teeth of the saw at the same time by the swaging process.

The improvement consists, first, in the combination, with the stock or handle provided with an angular-shaped opening having its side walls converging from the base to the top, of a movable die and a wedge having a twofold purpose—adjusting and securing properties; secondly, in a wedge or key interposed between the stock and the removable die of the tool; and, finally, it consists in an improved swage composed of the parts which will be hereinafter more fully described, for spreading, drawing out, and sharpening the teeth of the saw.

The annexed drawings form a part of this specification.

Figure 1 represents a perspective view of a portion of a saw, showing some of the teeth swaged. Fig. 2 shows three teeth of a saw finished according to my swaging process. Fig. 3 is a side view of my improved swaging-tool. Fig. 4 is a perspective view of the pentagon die. Fig. 5 is a view showing the relative width and thickness of the fastening key or wedge.

The letter A represents the handle or stock portion of the tool, gradually increasing toward its upper end to form the enlarged head B. The head portion B of the stock or handle is formed with an angular-shaped opening, C, the side walls of which converge from the base to the top. This angular opening receives the detachable pentagon-shaped die D and a key or wedge, E, substantially as shown. It will be seen, by reference to Fig. 3 of the drawings, that the angular opening is larger in length than the pentagon-shaped die, so that the die can be adjusted upwardly to its seat, and in case of wear by the key or wedge E, located at its base. The head portion of the tool is also formed with two jaws, *a a*, with inclined or beveled faces *b b*, said beveled faces commencing at the opening C, and extending outwardly in opposite ways in an inclined direction (see Fig. 3) to the outer surface of the jaws. The inclined faces of these jaws *b* are preferably convex, as shown, for more effectually spreading the cutting-edge of a sawtooth; or they may be straight in some instances, for imparting the proper straight edge to the tooth. The inclined or beveled faces *d* of the pentagon die are also preferably convex, as shown, but in some cases they may also be straight; also, the beveled sides *e* of the die D are made to fit accurately the beveled sides *h* of the jaws. This die D and the head of the tool should be made of good steel and tempered hard, so as to perform their work well.

The parts, including the key, being finished, the pentagon die D is inserted in the angular-shaped opening in such a manner that the inclined faces of the die will have a proper relative position with the inclined faces of the jaws to form a sharp well-defined corner where the two inclined faces of each notch meet for cutting on the extreme edge of the saw-tooth. The wedge or key E is now inserted between the bottom of the die and the base of the angular opening, as seen in Fig. 3, and by a few taps on the end of the same the die is properly adjusted and locked in position for use, thus completing the swage. The tool is adjusted to the point of a tooth, *i*, the latter fitting the re-entering angular recess *k*, formed by the inclined faces of the die and jaws, and the stock of the tool is struck a series of blows by a hammer, thus causing the edge of the tooth to be spread, drawn out, and sharpened, as seen at *i* in Figs. 1 and 2 of the drawings. This process of hammering on the tool causes the point portion of the teeth to be spread laterally on opposite sides and to be drawn out with a feathered edge, and at the same time has the desired effect of hardening the edge of the tooth and making it to wear much better and to last longer without sharpening than by the old process of swaging. A skillful saw-maker or saw-mill hand will adjust the tool on the tooth in the direction of the best-supported portion of the tooth, in order that the force of the blow, when applied to the end of the stock, will give the proper and desired shape and feathered edge to the tooth, and at the same time causing a slight concave on opposite sides of the point of the tooth, which will serve as guide-marks in the future sharpening of the saw-teeth by means of a file.

As before stated, the die D is removable for the purpose of allowing the inclined faces of the jaws to be ground and repaired when necessary, and the lower corners of the fastening-key, as well as the corners of the angular-shaped opening, are preferably rounded, so as to re-enforce the metal at the corners of the openings, and prevent possible breaking of the jaws at these points.

What I claim as my invention, and desire to secure by Letters Patent, is—

1. The improved swaging-tool consisting of the stock A, with enlarged head B and angular-shaped opening C, pentagon-shaped die D, and locking key or wedge E, substantially as described, for the purposes set forth.

2. The combination, with a saw-swaging stock having an angular opening that converges from the base to the top, of a movable die and adjusting and fastening wedge, said wedge being located at the base of the die, substantially as described, and for the purpose set forth.

3. The combination, with a saw-swaging stock having an angular-shaped opening and a pentagon-shaped die, of a wedge arranged between the base of said opening and the under side of the die, whereby the die can be adjusted to its seat in case of wear, substantially as described.

In testimony whereof I affix my signature in presence of two witnesses.

PATRICK J. HOGAN.

Witnesses:
GEORGE W. LONG,
THOMAS F. SHAY.